(12) United States Patent
Dowd et al.

(10) Patent No.: US 7,783,965 B1
(45) Date of Patent: *Aug. 24, 2010

(54) MANAGING LINKS IN A COLLECTION OF DOCUMENTS

(75) Inventors: Stephen C. Dowd, Mercer Island, WA (US); Yohko A. Kelley, Redmond, WA (US)

(73) Assignee: Adobe Systems Incorporated, San Jose, CA (US)

( * ) Notice: Subject to any disclaimer, the term of this patent is extended or adjusted under 35 U.S.C. 154(b) by 727 days.

This patent is subject to a terminal disclaimer.

(21) Appl. No.: 11/688,805

(22) Filed: Mar. 20, 2007

Related U.S. Application Data (63) Continuation of application No. 10/254,729, filed on Sep. 24, 2002, now Pat. No. 7,194,469.

(51) Int. Cl.
*G06F 17/27* (2006.01)
(52) U.S. Cl. .................................................. 715/208
(58) Field of Classification Search ............... 715/208
See application file for complete search history.

(56) References Cited

U.S. PATENT DOCUMENTS

| | | | |
|---|---|---|---|
| 5,768,578 A | 6/1998 | Kirk et al. | |
| 5,801,702 A | 9/1998 | Dolan et al. | |
| 5,819,301 A | 10/1998 | Rowe et al. | |
| 5,860,074 A | 1/1999 | Rowe et al. | |
| 5,870,552 A | 2/1999 | Dozier et al. | |
| 5,895,470 A | 4/1999 | Pirolli et al. | |
| 5,905,991 A | 5/1999 | Reynolds | |
| 6,189,012 B1 | 2/2001 | Mital et al. | |
| 6,189,019 B1 | 2/2001 | Blumer et al. | |
| 6,263,332 B1 | 7/2001 | Nasr et al. | |
| 6,298,357 B1 | 10/2001 | Wexler et al. | |
| 6,381,637 B1 | 4/2002 | Kamada | |
| 6,457,028 B1 | 9/2002 | Pitkow et al. | |
| 6,693,652 B1 | 2/2004 | Barrus et al. | |
| 6,842,755 B2 | 1/2005 | Maslov | |
| 2001/0044794 A1 | 11/2001 | Nasr et al. | |
| 2002/0091684 A1 | 7/2002 | Nomiyama et al. | |
| 2002/0100058 A1 | 7/2002 | Hirose et al. | |
| 2002/0129094 A1 | 9/2002 | Reisman | |

(Continued)

OTHER PUBLICATIONS

The Microsoft Office Web Site Creation and Management Solution, "*Effective Site Management with Microsoft FrontPage 2002*," White Paper, May 2001.

(Continued)

*Primary Examiner*—Doug Hutton
*Assistant Examiner*—Tionna Smith
(74) *Attorney, Agent, or Firm*—Fish & Richardson P.C.

(57) ABSTRACT

Methods and apparatus, including computer program products, implement techniques for managing links in a collection of documents. A plurality of links are identified in a collection of one or more documents. A visual representation of the identified links is displayed to a user. Each link has an associated source and destination. The source represents a location in the collection of documents from which the link points. The destination represents a location to which the link points. The visual representation includes information describing the sources and destinations for each of the identified links. Two or more of the links are simultaneously selectable for modification in response to user input in the visual representation.

20 Claims, 6 Drawing Sheets

U.S. PATENT DOCUMENTS

| | | |
|---|---|---|
| 2002/0130907 A1 | 9/2002 | Chi et al. |
| 2003/0038836 A1 | 2/2003 | Ronald et al. |
| 2004/0049555 A1 | 3/2004 | Schilit et al. |
| 2004/0068527 A1 | 4/2004 | Smith, III |
| 2004/0141014 A1 | 7/2004 | Kamiwada et al. |
| 2005/0010865 A1 | 1/2005 | Kuppusamy et al. |
| 2005/0120292 A1 | 6/2005 | Suzuki |
| 2005/0131927 A1 | 6/2005 | Fildebrandt et al. |

OTHER PUBLICATIONS

Jeff Carlson and Glenn Fleishman, Real World Adobe GoLive 6, Peachpit Press, Berkeley, California, 2002, Chapters 1, 17 and 18, pp. 1-53, 433-454, 455-451.

Adobe Systems Incorporated, Adobe GoLive 6.0 Classroom in a Book, Peachpit Press, Berkeley, California, 2002, Lessons 1-5, 14 and 15, pp. 10-54, 58-96, 100-150, 154-194, 198-236, 495-533, 538-582.

Hyperlink Report

Report Generated: Wednesday, January 16, 2002 9:30 AM
Documents: HLTestDoc3.indd, HLTestDoc2.indd, HLTestDoc1.indd, HLLinkORama.indd, HLFrontMatter.indd — 330
Hyperlinks(Source): 23 found

| Name △ | Document | Page # | Destination |
|---|---|---|---|
| Hyperlink 1 | HLLinkORama.indd | 8 | Front Matter - Page 1 |
| Hyperlink 10 | HLLinkORama.indd | 10 | Doc 2 - Page 2 |
| Hyperlink 11 | HLLinkORama.indd | 10 | Doc 2 - Page 1 |
| Hyperlink 12 | HLLinkORama.indd | 10 | http://www.gprparts.com |
| Hyperlink 13 | HLLinkORama.indd | 10 | http://www.adobe.com |
| Hyperlink 14 | HLLinkORama.indd | 10 | Doc 2 - Anchor 3 |
| Hyperlink 15 | HLLinkORama.indd | 10 | Doc 2 - Anchor 2 |

310

Destinations: 23 found

| Name | Type | # Links | Status | Reason |
|---|---|---|---|---|
| Front Matter - Page 1 | Page:HLFrontMatter.indd:Page: 1 | 1 | OK | — |
| Doc 1 - Page 1 | Page:HLTestDoc1.indd:Page: 2 | 1 | OK | — |
| Doc 1 - Page 2 | Page:HLTestDoc1.indd:Page: 3 | 1 | OK | — |
| Doc 2 - Page 1 | Page:HLTestDoc2.indd:Page: 4 | 1 | OK | — |
| Doc 2 - Page 2 | Page:HLTestDoc2.indd:Page: 5 | 1 | OK | — |
| Doc 3 - Page 1 | Page:HLTestDoc3.indd:Page: 6 | 1 | OK | — |
| Doc 3 - Page 2 | Page:HLTestDoc3.indd:Page: 7 | 1 | OK | — |

320

[ Save ] — 340  [ Delete ] — 350  [ Edit ] — 360  [ Done ] — 370

MANAGING LINKS IN A COLLECTION OF DOCUMENTS

CROSS-REFERENCE TO RELATED APPLICATIONS

This application is a continuation application of, and claims priority to, U.S. patent application Ser. No. 10/254,729, entitled Managing Links in a Collection of Documents, to inventors Stephen C. Dowd and Yohko A. Kelley, which was filed on Sep. 24, 2002. The disclosure of the above application is incorporated herein by reference in its entirety.

BACKGROUND

This invention relates to managing links in a collection of documents.

Links are used in many computer applications, such as web browsers and document management applications such as the Adobe Acrobat® software available from Adobe Systems Incorporated of San Jose, Calif. A link represents a path connecting a source to a destination within or between electronic documents. A destination can be located in the same document as the source, or in a different document or other file, which can be located on the same computer as the source document, or remotely, over a network such as the Internet.

Links can occur in a variety of structured electronic documents, such as web pages, electronic books, and other structured electronic documents such as Portable Document Format (PDF) documents. For example, most web pages contain links that point users to other pages, images, or documents within a web site or to items found in other locations such as other web pages. Further, in an electronic book or "e-book," links are often used to allow the reader to jump to different points in the text. For example, the table of contents of an e-book can contain links to the various chapters in the book enabling a returning reader to jump right to the last chapter read.

A link can be represented in various ways, including text, images and symbols. Commonly, in a visual representation of a document that includes links, sources are represented by underlined or colored text. A destination pointed to by a source can be one of many different types of files including documents, images, and URLs.

SUMMARY

The invention provides methods and apparatus, including computer program products, for managing links in a collection of documents. In general, in one aspect, the invention features methods and apparatus, including computer program products, implementing techniques for managing links in a collection of documents. The techniques include identifying a plurality of links in a collection of one or more documents and displaying a visual representation of the identified links. Each link has an associated source and destination. The source represents a location in the collection of documents from which the link points. The destination represents a location to which the link points. The visual representation includes information describing the sources and destinations for each of the identified links. Two or more of the links are simultaneously selectable for modification in response to user input in the visual representation.

Particular implementations can include one or more of the following features. The plurality of links can include all or a portion of the links in the collection of documents. The visual representation can include information such as information that identifies the document in which the associated source is located or the location of the associated source within that document. Similarly, the visual representation can include information that identifies the destination associated with a link, the number of links that point to a given destination, or the location of a destination, which can include a location in a document in the collection of documents or a location external to the collection of documents, such as an external file (e.g., an image file, a multimedia file or a web page). The visual representation can also include information that identifies a link type or a link condition for each link. Each link can have a type selected from the group consisting of page link, html link, and text link. The information identifying a link condition can include information describing an object that is selectable to trigger a link, information describing a sequence of actions that is performable to trigger a link, or a time delay the passage of which will trigger a link.

The techniques can also include receiving user input selecting one or more links in the visual representation and specifying a modification to the selected links, and modifying the visual representation and the selected links according to the specified modification. The user input specifying a modification can specify a new destination for two or more selected links. The user input selecting one or more links can select an arbitrary subset of the identified links including a plurality of the selected links, or a subset of the identified links. The selected subset can include a plurality of the identified links, but less than all of the identified links In general, in another aspect, the invention features methods and apparatus, including computer program apparatus, implementing related techniques for managing links in a collection of documents. The techniques include displaying a visual representation of links in a collection of documents, receiving user input selecting a plurality of links in the visual representation and specifying a modification to be applied to the selected links, and modifying the visual representation and the selected links according to the specified modification. Each link has an associated source representing a location in the collection of documents from which the link points and an associated destination representing a location to which the link points. The visual representation includes information describing the sources and destinations for each of the links.

The invention can be implemented to provide one or more of the following advantages. All sources and destinations in a given set of documents can be displayed in one place such as a single dialog or window or set of dialogs or windows or lists. Multiple sources can be edited at one time, which can save time in designing web pages, e-books and other documents that utilize links. Changes to a single destination can be applied to multiple sources that point to that destination.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
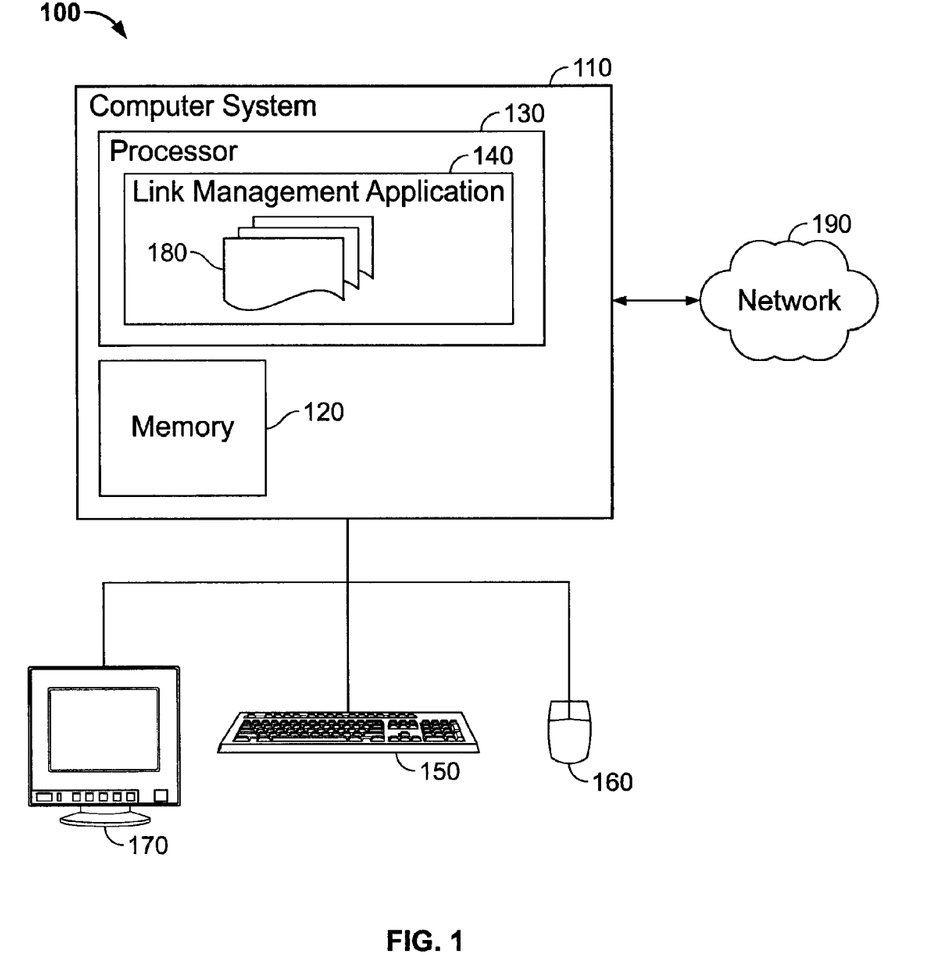
FIG. 1 is a block diagram illustrating a computer system suitable for implementing link management operations according to one aspect of the invention.
Figure 2:
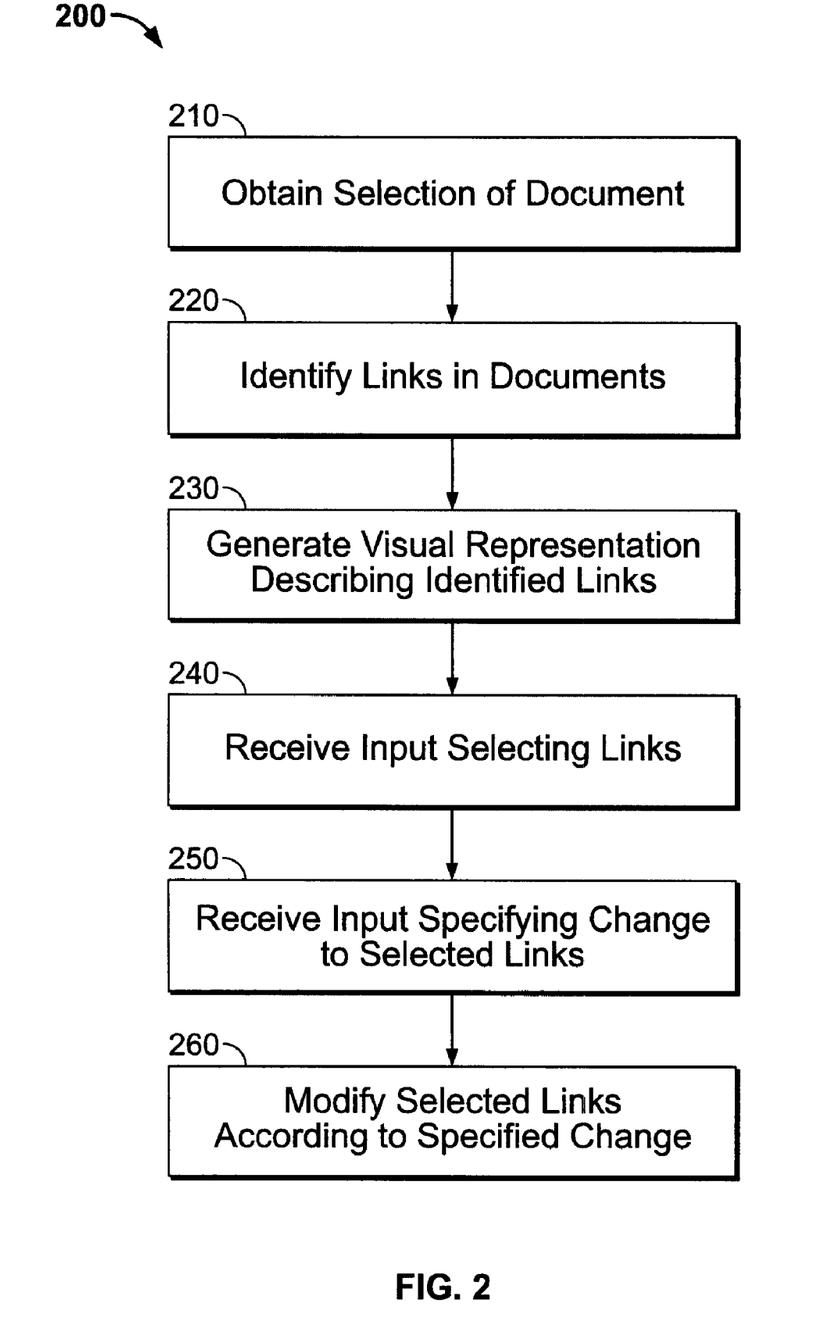
FIG. 2 is a flow diagram illustrating a general method for managing links according to one aspect of the invention.

A link management system allows links from a collection of one or more electronic documents to be displayed and managed within a visual representation implemented by a computer system. FIG. 1 illustrates one such link management system 100, implemented in a computer system 110 of conventional construction. Computer system 110 includes a memory 120 and a processor 130 for running a link management application 140, which can be implemented in a web browser, web design application, page layout application, or other document management application. Link management application 140 is configured to access a collection of documents 180. Documents in collection 180 contain links that point to locations within or between documents in collection 180, and/or to other locations accessible to link management application 140 (e.g., files stored in memory 120 or accessible over a network 190 such as a LAN, the World Wide Web or the Internet. Each link represents a path that connects a source to a destination. A source represents a location from which a link points. A destination is the location to which a link points. Computer system 110 also includes input devices such as a keyboard 150 and a mouse 160 as well as output devices such as monitor 170. FIG. 2 illustrates one method 200 defining a link management session implemented in a link management application 140. To begin the link management session, link management application 140 obtains a selection of one or more documents from a collection of documents (step 210). The documents can be selected based on user input selecting individual documents from a collection of documents (for example, a website stored in memory 120). Alternatively, the selected documents can include a set of documents that are open in link management 140, all documents in a specified directory, or some other arbitrary collection of documents.

Link management application 140 identifies links in the selected documents (step 220). In one implementation, link management application 140 identifies links in the selected documents by retrieving source and destination tables from the each of the selected documents. Using this information, link management application 140 generates a visual representation of all of the links in the selected documents (step 230). The visual representation includes information describing each of the identified links, which can include source and destination information that describes the source and destination of each of the links.

In different implementations, the source and destination information can describe the corresponding sources and destinations at different levels of detail. For example, the source or destination information for a given source or destination can identify a name or label assigned to the source or destination, and will typically identify the document in which the source or destination is located, and a location, such as a page, within such a document from or to which the link points. In addition, the source and/or destination information can describe additional characteristics of the link. These characteristics can include, for example, the name of a destination pointed to by a particular source, a "type" of link (e.g., a "URL" link pointing to a page identified by a Uniform Resource Locator, a "Page" link pointing to a particular document page, or a "text" link pointing to a particular text string), and the number of sources pointing to a particular destination. Additionally, source information can describe a link condition corresponding to an event that will trigger the link, such as the selection of an object, such as a paragraph, column, line of text, or image in the document, the occurrence of a predetermined action or sequence of actions while the document is open and displayed to a user, or even the passage of a predetermined amount of time. Optionally, the amount of detail that the source and destination information provides can be configured by the user.

The visual representation is displayed to the user though the user interface of link management application 140 over an output device such as monitor 170. Link management application 140 can be configured to organize and display links in the visual representation in any convenient fashion. For example, the visual representation can include a list of links organized by document and page. Link management application 140 can be configured to provide the user with a variety of choices of how the links will be organized and displayed in the visual representation, as will be described in more detail below.

Figure 3:
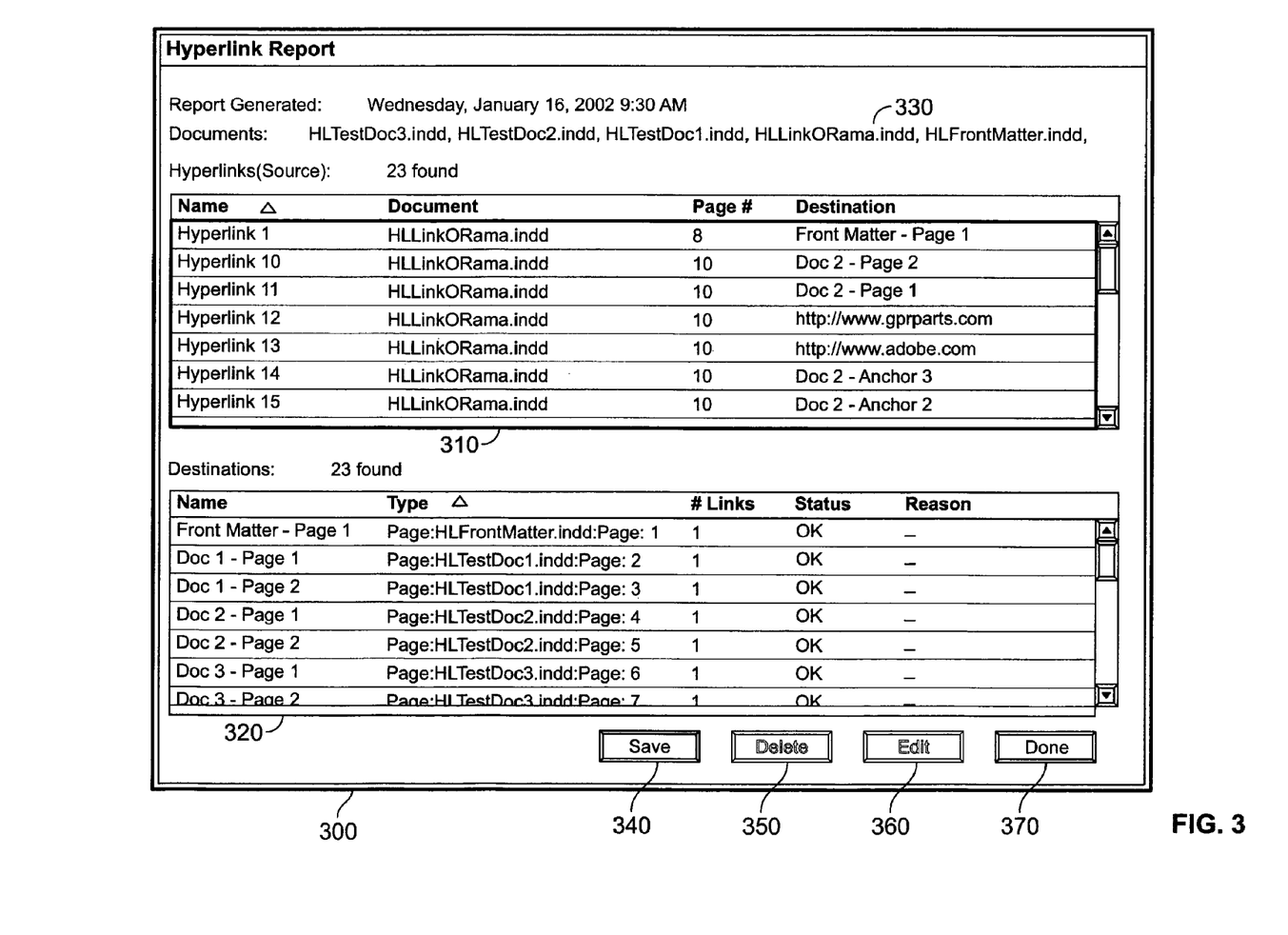
FIG. 3 illustrates one example of a user interface of a link management application for managing links in a collection of documents according to an aspect of the invention.

In one implementation, illustrated in FIG. 3, link management application 140 generates a list of sources, which includes source information describing the source for each of the identified links, and a list of destinations, which includes destination information describing the destination for each of the identified links. The source list 310 and destination list 320 are displayed in separate windows of visual representation 300 in the user interface of link management application 140. The details of this implementation are described in more detail below.

Returning to FIG. 2, the user can select one or more links for modification in the user interface (step 240). The links can be selected based on user input selecting individual links among those displayed in the visual representation. The user can select individual links for editing using conventional selection techniques, such as a click of mouse 160. The user can also select an arbitrary combination of identified links—for example, a contiguous block of links (e.g., using a conventional "shift-click" operation), or a non-contiguous combination of links (e.g., using a "control-click" operation). Thus, for example, in the implementation of FIG. 3, the user can select one or more sources or destinations for editing by making the appropriate selection in source list 310 or destination list 320.

The user can then specify a change or changes to the selected links (step 250). In one implementation, in response to the selection of one or more links in step 240, link management application 140 prompts the user for changes to the selected sources—for example, by generating and displaying a link edit dialog identifying link attributes, such as the type of link, the identity of the link's source or destination, the appearance of the source as displayed in the document, or the like, that can be edited by the user. The user can then modify one or more attributes of each selected link by making the appropriate changes in the edit dialog. Thus, for example, after selecting a number of sources that point to different destinations (e.g., different URL's), the user can specify in step 250 a single destination (e.g., URL) to which the selected sources will point. In response to the specified changes, link management application 140 modifies the relevant link or links accordingly (step 260).

FIG. 3 illustrates one implementation of a visual representation of identified links, in the form of a "Hyperlink Report" 300 that describes the identified links in list form. As shown in FIG. 3, report 300 includes a source list 310 describing the sources and a destination list 320 describing the destinations for all links identified in the selected documents, which are identified in Documents header 330. Source list 310 provides a variety of information about each source, including, for example, the name (or tag) of the source, the document in which the source is located, the location (e.g., page number) within the document at which the source is located, and the destination to which the source points. Thus, for example, the first source listed in source list 310 corresponds to a source identified by the name "Hyperlink 1", which is a tag or name assigned to the source (e.g., by the document author or publisher, or the user) to identify the source and does not necessarily indicate or correspond to how the source is represented within the document. The entry in the Document heading of source list 310 indicates that that the source named "Hyperlink 1" is located in the document "HLLinkORama.indd." Additionally, the page category indicates that the source is located on page eight of the "HLLinkORama" document. Finally, the destination category shows that the "Hyperlink 1" source points to a destination identified by the name "Front-Matter—Page 1."

Similarly, destination list 320 provides a variety of information about each destination, including, e.g., the destination name, the type of link and destination, the number of links to the destination, and the status of the link. Thus, the first destination listed in destination list 320 corresponds to a destination identified by the name "Front Matter—Page 1" (which can be an arbitrary identifier assigned by the author, publisher or user as described for sources above). The "Type" entry for this destination, "Page:HLFrontMatter.indd:Page 1", describes the type of link and destination—here, a "Page" link, directing the user to a default location, such as the upper right corner, of a specified document and page (here, page 1 of the document named "HLFrontMatter.indd"). Other link types can include, for example, "URL" links that direct the user to a location identified by a Uniform Resource Locator (e.g., a page on the World Wide Web), and "Text" links that direct the user to a particular text passage in a specified document. The number of links column indicates how many different sources point to the destination in question (here, just one link points to the destination "Front Matter—Page 1"). The entry in the link status column indicates that the link to this destination is operable ("OK"). Alternatively, an "Error" entry in the Status column would indicate the existence of a link error—for example, that the path to the destination is broken (i.e., that no source points to that destination)—and might prompt the user to revisit the relevant entry in source list 310 to ensure that the link in question properly points to the destination. Additional information for any link error can be provided in the "Reason" column of the destination list.

Optionally, link management application 140 can be configured to allow the user to organize and sort link information in a variety of ways—for example, by selecting a heading in source list 310 or destination list 320. Thus, for example, in the implementation illustrated in FIG. 3, the user has selected to list sources in source list 310 alphabetically by name, as indicated by the triangle symbol next to the "Name" heading in source list 310. Similarly, the user has selected to view destinations by type, as indicated by the corresponding symbol next to that heading in destination list 320. Link report 300 also includes Save, Delete, Edit, and Done buttons 340, 350, 360 and 370, respectively.

As discussed above, the user can select one or more links (i.e., sources or destinations) using conventional selection techniques through the user interface of link management application 140. The user can delete the selected sources or destinations by further selecting Delete button 350, which causes link management application 140 to eliminate the selected sources or destinations from link report 300 and to make corresponding changes to the selected documents in collection 180 (e.g., severing any affected links, etc.) To edit the selected sources or destinations, the user selects Edit button 360.

Figure 4:
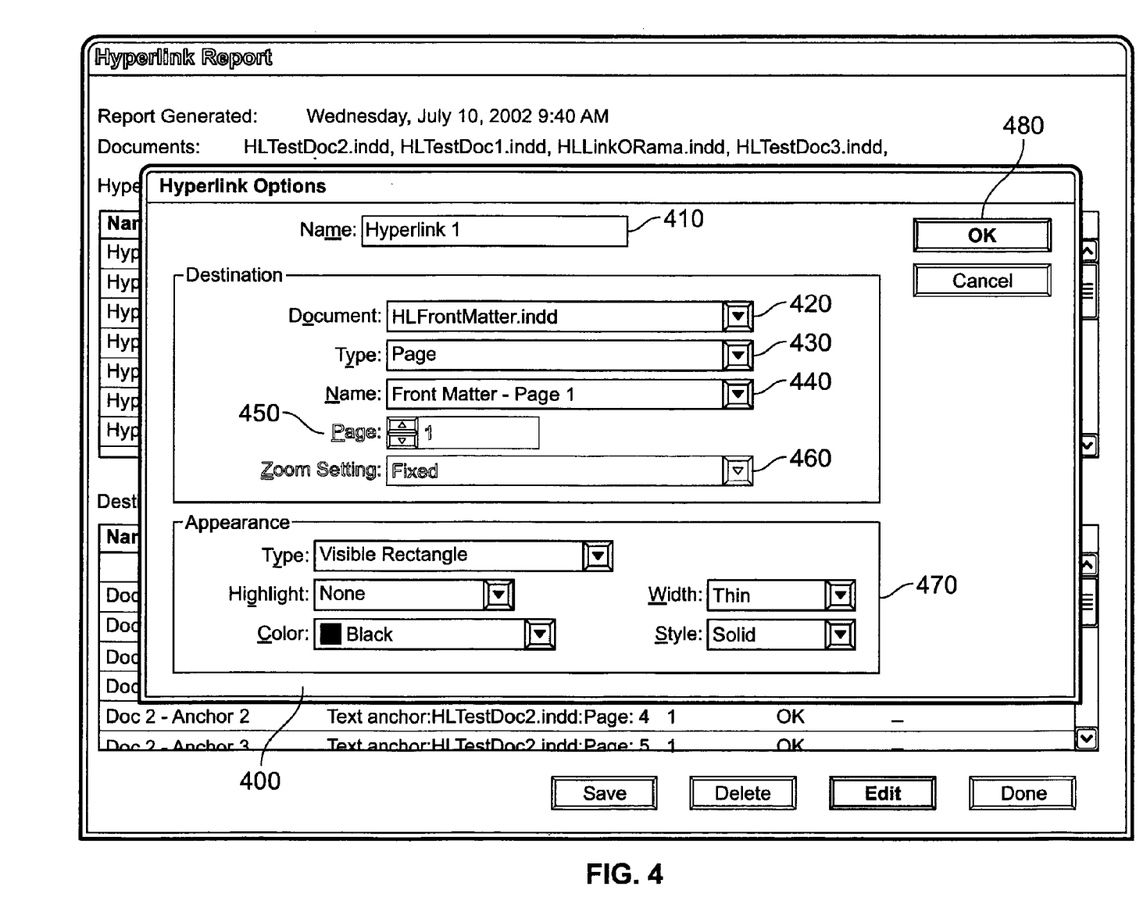
FIG. 4 illustrates one example of a source edit dialog generated by a link management application implementing the interface of FIG. 3.

FIG. 4 illustrates one implementation of a source edit dialog 400 that is generated and displayed by link management application 140 in response to input selecting one or more sources in source list 310 and activating Edit button 360. FIG. 4 illustrates a source edit dialog 400 for the editing the source "Hyperlink 1" from source list 310, identified by name in Name field 410. Source edit dialog 400 includes a number of fields through which the user can edit properties of the selected source(s), including the name of the source (in field 410). Optionally, link management application 140 can be configured to prevent modification to the source name (e.g., by greying out Name filed 410) if more than one source has been selected. Destination specific fields include a document field 420, in which the user can change the document to which the source points (e.g., by selecting a new document from a dropdown list of available documents that can be linked to in link management application 140). Type field 430 permits the user to change the type of the link associated with the selected source (e.g., from a "Page" link to a "URL" or "Text" link as described above). Similarly, the user can change the name of the destination to which the source points in Name field 440 and specific page of the destination document (where appropriate) in Page field 450. Zoom Setting field 460 enables the user to specify a zoom setting with which a destination document will be displayed when the link is followed. Source edit dialog 400 also allows the user to modify the appearance of the source as displayed in the source document using appearance fields 470. The source represented in the dialog shown in FIG. 4 is identified as a "visible rectangle" type source, and the user can modify appearance properties such as highlighting, color, width and style of the rectangle. By selecting other source types, the user can cause link management application 140 to display other appearance attributes for modification. For example, for a source represented as an "invisible rectangle", the color, width and style attributes may not be relevant, although link management application 140 may allow the user to modify text styles (e.g., color, underlining, etc.) for such a source.

Thus, for example, a web site may include a number of sources that point to the same destination page within the web site, such as a recurrent menu item linking to contact information. If the designer generates a new contact page to replace the previous page, all of the sources that link to the old contact page (e.g., "Contact Us" hyperlinks on each page of the web site) can be redirected to the new page, by simply modifying the Document field 420 to identify the new page instead of the old page. When the user selects "OK" button 460, link management application 140 removes source edit dialog 400 from the display. Any changes are then represented at the appropriate location in link report 300. Optionally, link management application 140 can be configured such that a change to one or more fields in a link edit dialog such as source edit dialog 400 causes link management application 400 to prompt the user (e.g., through additional link edit dialogs) for additional relevant information needed to support the change.

Figure 5:
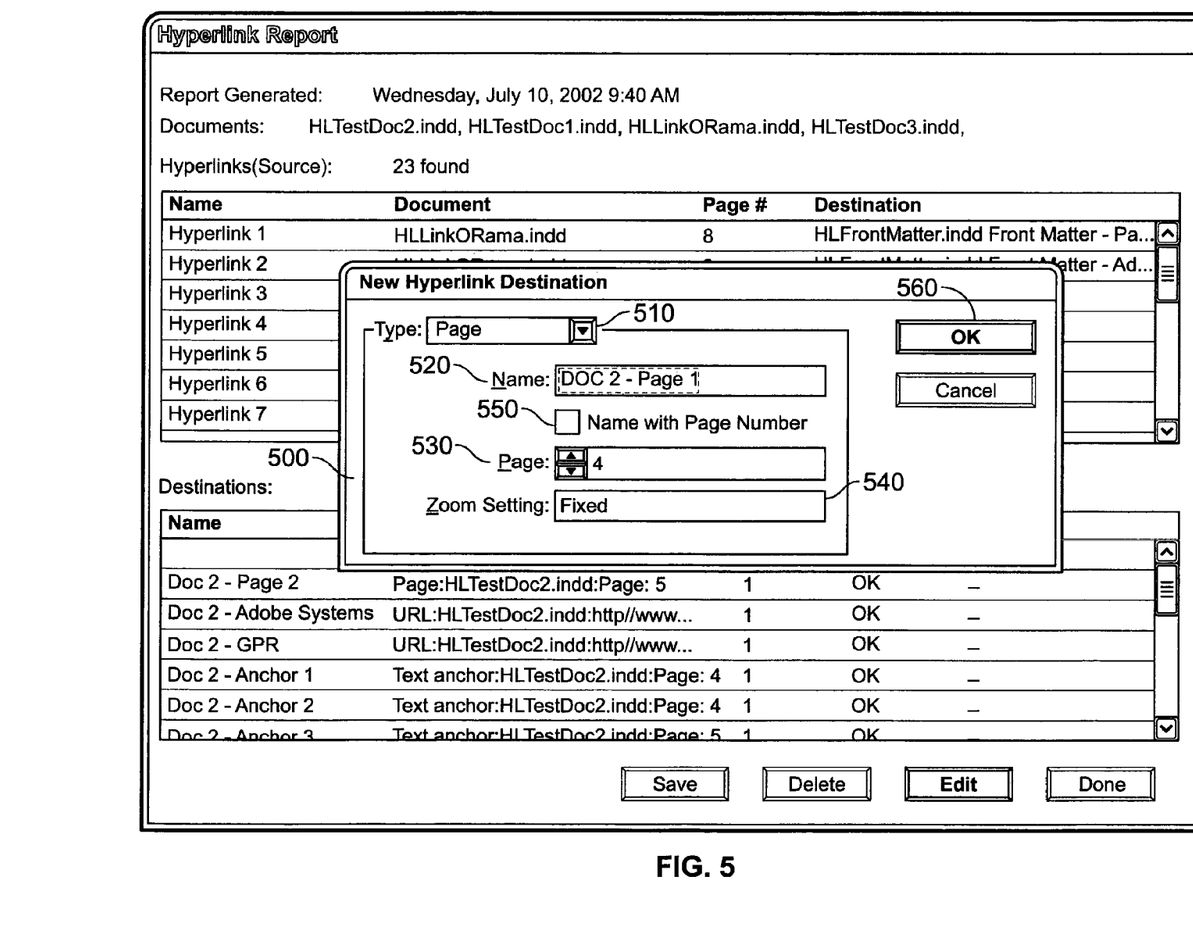
FIG. 5 illustrates one aspect of a destination edit dialog generated by a link management application implementing the interface of FIG. 3.

FIG. 5 illustrates one implementation of a destination edit dialog 500 that is generated and displayed by link management application 140 in response to input selecting one or more destinations in destination list 320 and activating Edit button 360. As with source edit dialog 400, discussed above, destination edit dialog 500 is configured to allow the user to conveniently specify changes to one or more properties of selected destinations, including, for example, the type, name, or other properties of the selected destinations as described above. In particular, FIG. 5 illustrates a destination edit dialog for the destination having name "Doc 2—Page 1" from destination list 320 shown in FIG. 3. As shown, destination edit dialog 500 includes a Type field 510 that identifies the type of the selected destination(s) (here "Page") and through which the user can specify a different type. Name field 520 indicates the name assigned to the selected destination, which can be changed as desired by the user. In Page field 530, the user can identify and change the document page on which the destination is located. Zoom setting field 540 allows the user to change the zoom setting as described above. Finally, a Name with Page Number check box 550 allows the user to specify that a change in the page of the destination will automatically result in a corresponding change in the destination's name.

Figure 6:
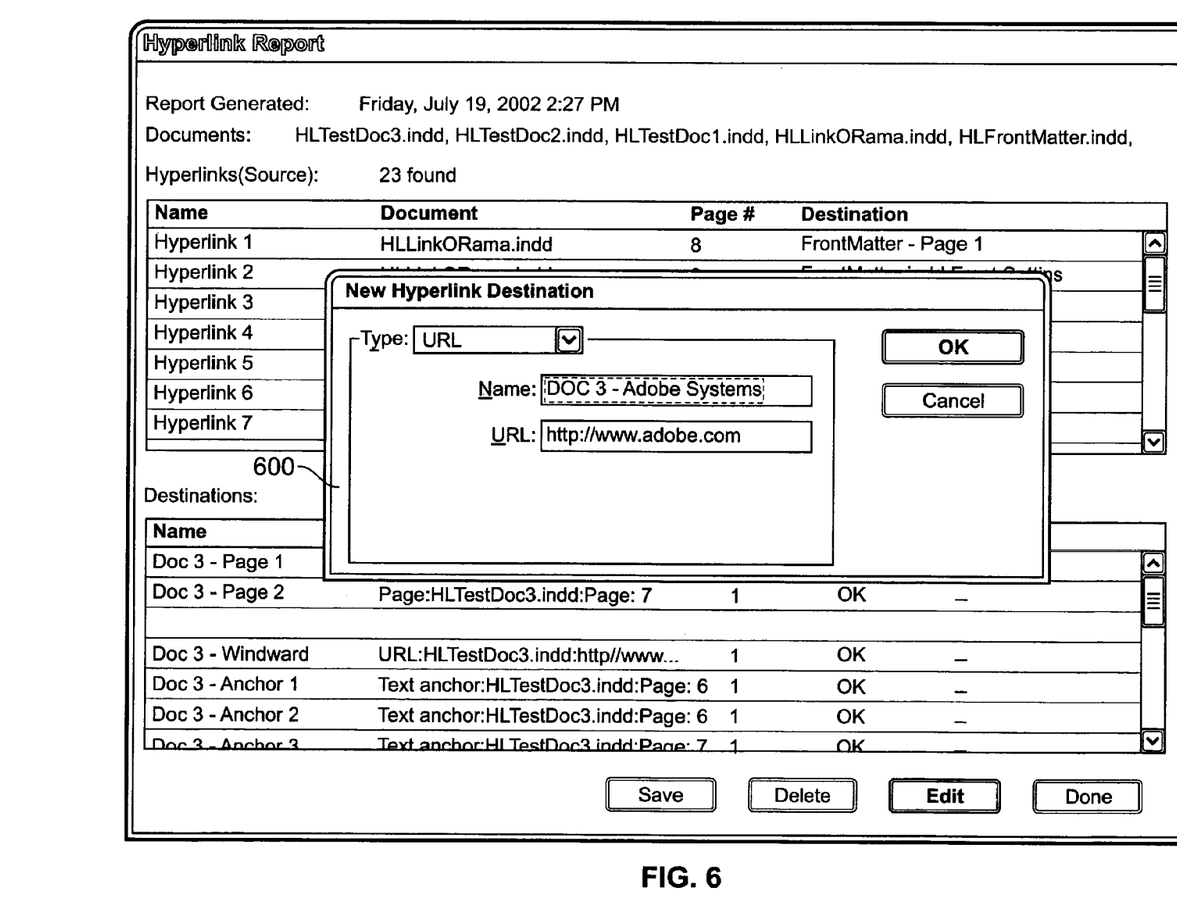
FIG. 6 illustrates another aspect of a destination edit dialog generated by a link management application implementing the interface of FIG. 3.

Link management application 140 can be configured to provide context sensitive edit dialogs, such that one or more of the fields of destination edit dialog 500 may vary depending on the type of the selected destination(s). Thus, for example, destination edit dialog 500 is a Page destination edit dialog and includes a number of fields that are specific to Page type destinations (i.e., Page field 540, Name with Page Number box 550, etc.). By contrast, FIG. 6 illustrates a URL destination edit dialog 600 which includes a URL field 610, in which the user can identify and change the URL of the selected destination.

Changing a destination alters every source pointing to that destination accordingly; when more than one destination was selected, changes in the destination edit dialog modify every source that points to any of the selected destinations according to the specified destination changes. When the user selects "OK" button 560, link management application 140 removes destination edit dialog 500 from the display. Any changes are then represented at the appropriate location in link report 300.

After editing or deleting sources or destinations, the user can save the modified link report for use in other applications (e.g., as Microsoft Excel spreadsheet) or for later use by selecting Save button 340. At this point (or, alternatively, after termination of the link management session or at any other convenient time), link management application 140 can also implement any corresponding changes to the selected documents in collection 180. When any desired modifications or deletions have been completed, the user selects Done button 370 and link management application 140 terminates the link management session and removes link report 300 from the display.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, the steps of the invention can be performed in a different order and still achieve desirable results. Accordingly, other embodiments are within the scope of the following claims.

What is claimed is:

1. A system, comprising:
a user input device, a display, a memory device, and a processor programmed to:
identify a plurality of links in a collection of one or more documents, each link having an associated source and destination, the source representing a location in the collection of documents from which the link points and the destination representing a location to which the link points; and
display a visual representation of the identified links, the visual representation including information describing the sources and destinations for each of the identified links, two or more of the links being selectable as a group for simultaneous modification in response to user input in the visual representation.

2. The system of claim 1, wherein:
the plurality of links include all of the links in the collection of documents.

3. The system of claim 1, wherein:
for each identified link the visual representation includes information identifying the document in which the associated source is located.

4. The system of claim 1, wherein:
for each identified link the visual representation includes information identifying the location of the associated source within the document in which it is located.

5. The system of claim 1, wherein:
for each link the visual representation includes information identifying the associated destination.

6. The system of claim 1, wherein:

for each link the visual representation includes information identifying a link type.

7. The system of claim 6, wherein:

each link has a type selected from the group consisting of page link, html link, and text link.

8. The system of claim 1, wherein:

for each link the visual representation includes information identifying a link condition for the associated source.

9. The system of claim 8, wherein:

the information identifying a link condition includes information describing an object that is selectable to trigger a link, information describing a sequence of actions that is performable to trigger a link, or a time delay the passage of which will trigger a link.

10. The system of claim 1, wherein:

for each link, the visual representation includes information identifying a location for the associated destination.

11. The system of claim 1, wherein:

for each link, the visual representation includes information identifying a location of the associated destination in a document of the collection of documents.

12. The system of claim 1, wherein:

the destination represents a location external to the collection of documents.

13. The system of claim 12, wherein:

the external location is an external file.

14. The system of claim 13, wherein:

the external file is an image file, a multimedia file or a web page.

15. The system of claim 1, wherein:

for each destination, the visual representation includes information identifying a number of links pointing to the destination.

16. The system of claim 1, where the processor is further programmed to:

receive user input selecting one or more links in the visual representation and specifying a modification to the selected links; and modify the visual representation and the selected links according to the specified modification.

17. The system of claim 16, wherein:

the user input specifying a modification specifies a new destination for the two or more selected links.

18. The system of claim 16, wherein:

the user input selecting one or more links selects an arbitrary subset of the identified links including a plurality of the selected links.

19. The system of claim 16, wherein:

the user input selecting one or more links selects a subset of the identified links, the selected subset including a plurality of the identified links, but less than all of the identified links.

20. A system for managing links in a collection of documents, comprising:

a user input device, a display, a memory device, and a processor programmed to:

display a visual representation of links in a collection of documents, each link having an associated source representing a location in the collection of documents from which the link points and an associated destination representing a location to which the link points, the visual representation including information describing the sources and destinations for each of the links;

receive user input selecting a plurality of links in the visual representation and specifying a modification to be applied simultaneously to the selected links; and modify the visual representation and the selected links according to the specified modification.

\* \* \* \* \*